US011615326B2

(12) United States Patent
Priel et al.

(10) Patent No.: US 11,615,326 B2
(45) Date of Patent: Mar. 28, 2023

(54) DIGITAL MDR (MANAGED DETECTION AND RESPONSE) ANALYSIS

(71) Applicant: CYBERINT TECHNOLOGIES LTD., Petach Tikva (IL)

(72) Inventors: Shay Priel, Nes Ziona (IL); Noam Ikar, Mishmar Hashiva (IL)

(73) Assignee: CYBERINT TECHNOLOGIES LTD., Petach Tikva (IL)

( * ) Notice: Subject to any disclaimer, the term of this patent is extended or adjusted under 35 U.S.C. 154(b) by 863 days.

(21) Appl. No.: 16/489,793

(22) PCT Filed: Mar. 5, 2018

(86) PCT No.: PCT/IL2018/050247
§ 371 (c)(1),
(2) Date: Aug. 29, 2019

(87) PCT Pub. No.: WO2018/163162
PCT Pub. Date: Sep. 13, 2018

(65) Prior Publication Data
US 2020/0005170 A1    Jan. 2, 2020

Related U.S. Application Data

(60) Provisional application No. 62/467,141, filed on Mar. 5, 2017.

(51) Int. Cl.
*G06N 5/04*        (2006.01)
*G06N 20/20*       (2019.01)
(Continued)

(52) U.S. Cl.
CPC .............. *G06N 5/04* (2013.01); *G06F 16/951* (2019.01); *G06F 40/279* (2020.01);
(Continued)

(58) Field of Classification Search
CPC ....................................................... G06N 5/04
See application file for complete search history.

(56) References Cited

U.S. PATENT DOCUMENTS

| 2015/0254566 | A1  | 9/2015  | Chandramouli et al. |
| 2016/0149943 | A1  | 5/2016  | Kaloroumakis et al. |
| 2016/0307201 | A1* | 10/2016 | Turgeman ............. G06F 21/316 |

OTHER PUBLICATIONS

International Search Report and Written Opinion of the International Searching Authority dated Jun. 25, 2018 in corresponding International application No. PCT/IL2018/050247; 10 pages.

(Continued)

*Primary Examiner* — Olisa Anwah
(74) *Attorney, Agent, or Firm* — Maier & Maier, PLLC

(57) ABSTRACT

A method for detecting an occurrence of an online event including retrieving a data item from online sources; forming a list by tagging words and/or strings within the data item according to predefined attributes such that the list includes the words and/or strings with their corresponding attributes; forming sequence items relating to the list according to a predefined criterion such that each sequence item includes at least the list and optionally additional preformed lists that have been formed in the same manner as the list and that have a shared concept with the list according to the predefined criterion; running each of the sequence items in a preformed machine learning classifying model that outputs a determination if there is an occurrence of the online event or not. The present invention further relates to generating the machine learning classifying model. The present invention also relates to a corresponding system.

11 Claims, 9 Drawing Sheets

(51) Int. Cl.
*G06N 20/10* (2019.01)
*G06F 16/951* (2019.01)
*G06F 40/279* (2020.01)
*G06N 3/04* (2023.01)
*G06N 7/00* (2023.01)

(52) U.S. Cl.
CPC ......... *G06N 3/0445* (2013.01); *G06N 3/0454* (2013.01); *G06N 7/005* (2013.01); *G06N 20/10* (2019.01); *G06N 20/20* (2019.01)

(56) References Cited

OTHER PUBLICATIONS

Shalev-Shwartz et al., "Understanding Machine Learning: From Theory to Algorithms", Cambridge University Press, 2014, p. 1-449; 449 pages.

\* cited by examiner

Attackers controlling a vast collection of internet devices unleashed several massive attacks on Friday that left dozens of popular websites, including Twitter Inc. and Netflix Inc., unreachable for parts of the day.

Web-technology provider Dynamic Network Services Inc., known as Dyn, said its domain-name-system services were subject to a massive denial-of-service attack starting at 7:10 a.m. EDT on Friday. After the first onslaught was resolved, Dyn reported another wave of attacks that caused disruptions through the day.

Distributed denial-of-service attacks can knock websites offline by flooding them with junk data, blocking the way for legitimate users. Dyn's DNS services are a key part of the digital supply chain that allows web addresses—Twitter.com, for instance—to take users to their destinations.

Fig. 2A

Source: The Wall Street Journal (Oct. 24 2016)

(Attackers)(controlling) a vast collection of internet devices (unleashed) several massive (attacks) on Friday that left dozens of popular [websites], including /Twitter In/ and /Netflix /Inc.,/ unreachable for parts of the day.

[Web]-technology [provider] /Dynamic Network Services Inc./, known as /Dyn/, said its [domain name system] services (were subject to) a massive /denial of service/ (attack) starting at 7:10 a.m. EDT on Friday. After the first onslaught was (resolved) /Dyn/ reported another wave of (attacks) that (caused)(disruption) through the day.

/Distributed denial of service/ (attacks) can (knock) [websites] [offline] by (flooding) them with junk data, (blocking) the way for legitimate users. /Dyn/'s [DNS] services are a key part of the digital supply chain that (allows) [web] addresses /Twitter.com/, for instance—to (take) users to their destinations.

Source: /The Wall Street Journal/ /Oct. 24 2016/

Fig. 2C

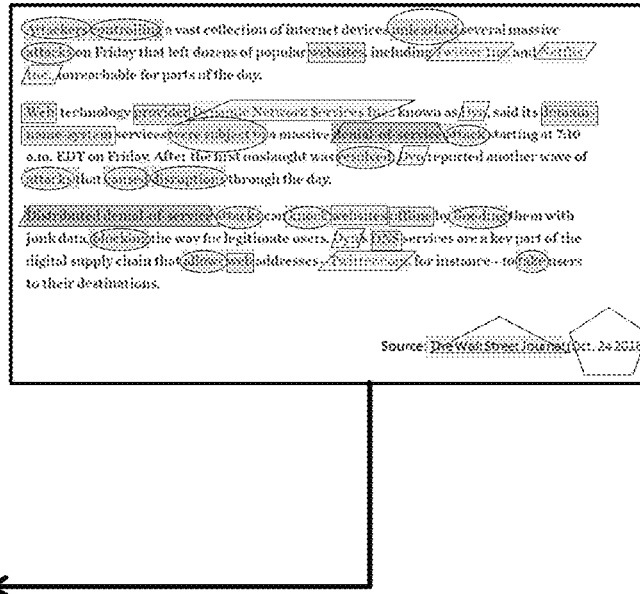

| Attackers | ○ |
| controlling | ○ |
| unleashed | ○ |
| attacks | ○ |
| websites | ☐ |
| Twitter Inc. | ▱ |
| Netflix Inc. | ▱ |
| Web | ☐ |
| Provider | ☐ |
| Dynamic Network Services Inc. | ▱ |
| Dyn | ▱ |
| Domain name system | ☐ |
| were subject to | ○ |
| Denial of service | △ |
| attack | ○ |
| resolved | ○ |
| Dyn | ▱ |
| attacks | ○ |
| caused | ○ |
| disruptions | ○ |
| Distributed Denial of Service | △ |
| attacks | ○ |
| knock | ○ |
| websites | ☐ |
| offline | ☐ |
| flooding | ○ |
| blocking | ○ |
| Dyn | ▱ |
| DNS | ☐ |
| allows | ○ |
| web | ☐ |
| twitter.com | ▱ |
| take | ○ |
| META: The Wall Street Journal | △ |
| META: OCT.24.2016 | ⬠ |

Fig. 2D

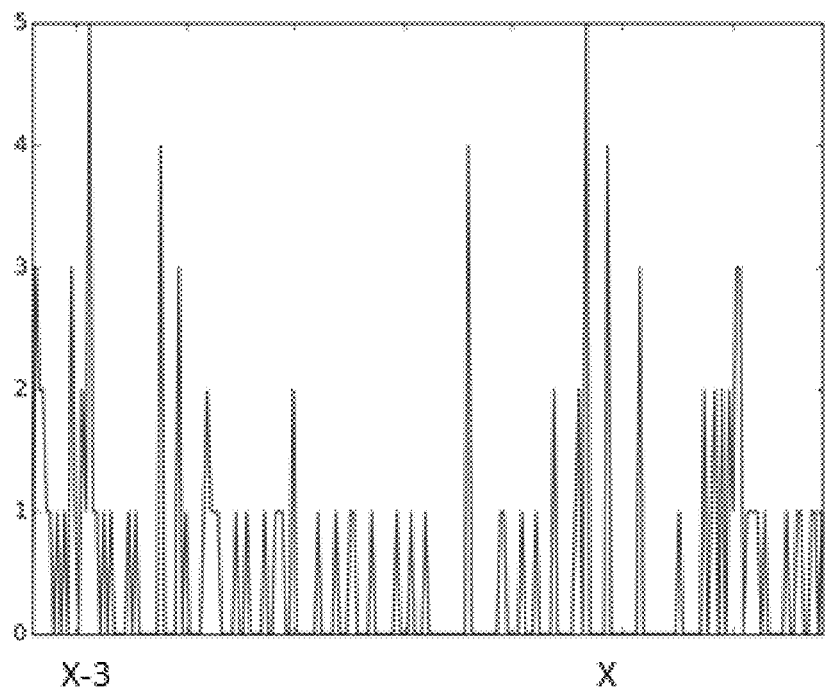
Fig. 5a: Number of related data items
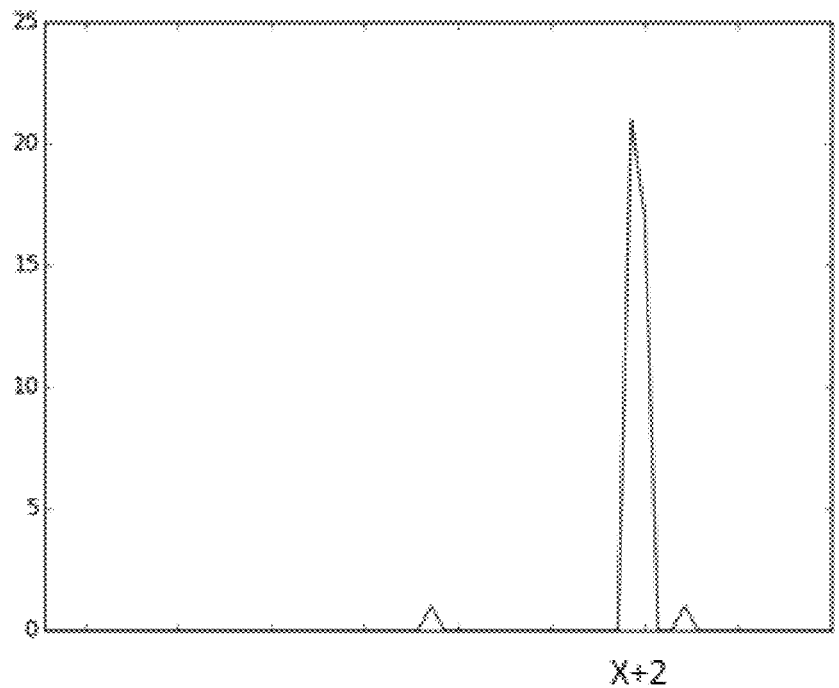
Fig. 5b: Number of social media inaccessibility alerts

DIGITAL MDR (MANAGED DETECTION AND RESPONSE) ANALYSIS

FIELD

The present invention relates to the field of computer digital MDR (managed detection and response). More particularly, the present invention relates to online monitoring, detecting and providing information such as alerts on potential malicious activity targeting the online assets of a subscriber or information on a subscriber specific subject of interest.

BACKGROUND

Several corporate bodies, companies, businesses and various organizations possess a plurality of online assets, which are crucial for business operations and interaction with customers. As cyber criminals and hacktivists grow more sophisticated, they utilize these online assets as an attack vector into the organizations by applying malicious content into the online assets.

Prior to having an online asset compromised, in many cases hacktivists gather information towards executing an attack, and in many cases also cooperate with other hacktivist groups in the actual launching of the attack. This cooperation and prior activities may include the distribution of software, coordinating of timing, the initialization of botnets and servers in various parts of the world, disguised infiltration of the target (via, e.g., phishing attacks), etc. Furthermore, attacks may be comprised of various vectors that are made to operate in sequence or in parallel.

According to another aspect, several of the companies, businesses and various organizations must be quickly updated on a specific subject of interest that occurs during real time.

This may be crucial for success in their business or for carrying out their objectives.

It is therefore an object of the present invention to provide a method and means for an effective pre-detecting of an online event (e.g. relating to a cyber-attack or a subscriber subject of interest).

It is further an object of the present invention to provide a method and means for alerting of the imminence of a cyber-attack.

It is yet another object of the present invention to provide a method and means for thwarting and/or mitigating the cyber-attack.

It is a further object of the present invention to provide a method and means for detecting an occurrence of an action related to a subject of interest of a subscriber and rapidly informing the subscriber of so.

Other objects and advantages of the present invention will become apparent as the description proceeds.

SUMMARY

The present invention relates to a system and method for detecting an occurrence of an online event (e.g. cyber-attack, subscriber subject of interest related event). The method may comprise obtaining data items (e.g. webpage content) from a network (e.g. internet), tagging the content by assigning certain items within the data item with certain attributes (e.g. words/strings relating to e.g. a specific customer, a specific attack-method, a specific time frame, metadata and more), thus forming a corresponding list. The list is optionally saved within a database for future generation of a machine learning classifying model. One or more sequence items are formed that include the list obtained and optionally additional similar lists having a predefined common concept (e.g. predefined rule) with the obtained list. The common concept may be one or more of—common attributes, lists obtained within a common time interval, etc. The sequence items relating to the obtained list are run in a machine learning classifying model to determine relevance or irrelevance to the online event. If found relevant—a subscriber may be alerted. The Present invention further relates to generating such a machine learning classifying model, comprising using a plurality of such lists (e.g. obtained over time) and similar sequence items relating to each list according to a predefined common concept with the corresponding list. Some of the sequence items are manually (or non-manually) tagged as being relevant or not to an event. The tagged sequence items and their results are provided as input to a machine learning training phase unit which generates machine learning classifying model(s) configured to determine the occurrence of an event or not. Optionally, non-tagged sequence items are provided as input to an unsupervised machine learning training phase unit which generates a machine learning classifying model. Certain classifying models may be chosen for further analysis according to their effective performance according to a machine learning validation phase using pre-stored corresponding tagged validation sequence items (that are run in the classifying models and the determination is compared with the actual (i.e. being relevant or irrelevant) results).

The present invention relates to a method and system for providing alerts about cyber threats and attacks on online assets belonging to subscribers (i.e. clients that receive the alerting service from the service operator) or alerts relating to a subscriber subject of interest. Malicious activities may include Distributed Denial-of-service (DDoS), defacements, fraud, spamming, malware drop-off, insertion of malicious code, account take over and more. Once a malicious activity is identified, alerts are disseminated automatically for immediate mitigation or in some cases automatically mitigated.

While several threats (or subscriber subjects of interest) are discovered days or even months after they occur the present invention enables detection of imminent attacks in real time, and at times even beforehand. The present invention enables comprehensive and continuous monitoring, and provides real-time feedback so as to enable a timely and effective response to any malicious activity before it compromises a subscriber's assets.

The present invention relates to scanning online data sources regularly using automated web-crawlers that collect data from various sources, both from the regular web, as well as from deep/dark-web, which include open sources and closed sources. The types of data collected may include forum notices, social media publications, blogs data, official pages, websites, etc. Once retrieved, these raw data items are stored in a common database. Each such data item is then analyzed and parsed in various dimensions, including: identifying customer-related words, cyber-words, activity-words, general terms, technical terms, special patterns of interest (including, e.g., IP addresses and emails), Cyber labeled items and business labeled items, etc. Each raw data item is then assigned a list of its identified attributes, as well as additional metadata related to the raw data item, including source, source type (e.g., forum, social media, blog, etc.), timestamp, etc. These raw data items are then grouped into linked sequences of data-items, according to the attributes identified in them, e.g., data items that correspond to a specific customer, data items that correspond to a specific source, data items that correspond to a specific cyber-threat type, etc.

The association of data items into such related collections enables the system to identify data items, which cannot be made related to cyber activity (or subscriber subject of interest) if considered independently, as contributing to the understanding of a cyber-threat (or subscriber subject of interest). This understanding can only be made by taking such data items in context, as part of a larger collection.

Collections of such data items are then augmented by non-raw data items, which are either external (e.g., information provided by the subscriber), or the product of analysis performed on the collection of raw-data (e.g., various statistics of raw-data, correlation information, profiling, context identification, time-sequence analysis, etc.). These non-raw data items are collected and generated to serve as evidence of a potential attack taking place in the past, present, or future. The exact behavior/performance of the system will become clearer in subsequent sections.

The present invention relates to a system and method for alerting upon the imminence of a cyber-attack (or that one has begun). The present invention also relates to a system and method for alerting upon an event in relation to a subscriber subject of interest (e.g. a trend, a business trend, a cyber-trend, etc.) The present invention comprises means for retrieving the online data items (e.g. texts of web pages). The retrieving means may retrieve data items of web pages related to a customer/subscriber or web pages related to cyber-attacks (known by the operators of the system). The retrieved items undergo an initial tagging according to their contents attributes, wherein the plurality of items within a retrieved data item are stored in a list, each item (of said plurality of items within a retrieved data item) with its corresponding attribute. Optionally, metadata related to the data item is also stored in the list. The "tagged" list is stored in a database.

An analyzer module accesses a plurality of such lists stored over time in the database and uses them to build one or more machine learning models. It should be clear that when a list is obtained and examined according to a machine learning model—it may be added to the database of lists for generating future models that will be more accurate as the database becomes larger. Each machine learning model generates a cyber-attack or a cyber/business label (subscriber subject of interest) detecting module according to the lists used therethrough. An averaging and majority decision function evaluates the best of the models generated (it could be one or more models) that could detect a cyber-attack (or subscriber subject of interest event). The best model(s) evaluated is/are provided as output and the currently retrieved tagged data item (the "tagged" list) related sequence items are processed by the best model(s) to determine if a cyber-attack (or subscriber subject of interest event) will take place (or is taking place or took place). Optionally an averaging function can be applied to the results of the best models (in case there is indeed more than one models that are defined as good for use according to a predefined criterion). If the result of the evaluation is positive, an alert is triggered to alert a subscriber (e.g. for him to take active mitigating steps). Optionally, automatic mitigation steps may be applied to thwart a cyber-attack (in the case of a cyber-attack).

The present invention relates to a method for detecting an occurrence of an online event comprising: retrieving a data item from online sources;
forming a list by tagging words and/or strings within the data item according to predefined attributes such that said list comprises the words and/or strings with their corresponding attributes;
forming sequence items relating to the list according to a predefined criterion such that each sequence item comprises at least said list and optionally additional pre-formed lists that have been formed in the same manner as said list and that have a shared concept with said list according to the predefined criterion;
running each of said sequence items in a preformed machine learning classifying model that outputs a determination if there is an occurrence of the online event or not.

Preferably, the data item is a webpage content.

Preferably, the online event relates to a cyber-threat or to a certain subject of interest.

Preferably, the method further comprises alerting a certain person when the determination of the occurrence of the event is deemed positive.

Preferably, the method further comprises performing an actionable step when the determination of the occurrence of the event is deemed positive.

Preferably, the actionable step is mitigating a cyber-threat.

Preferably, the list comprises a metadata attribute relating to the time or source of the retrieval of the data item.

Preferably, the method comprises running each sequence item in one or more preformed machine learning classifying models that output a determination if there is an occurrence of the online event or not, and applying an averaging function on the outputs of the machine learning classifying models that outputs a final determination if there is an occurrence of the online event or not.

Preferably, the method further comprises an initial stage of generating the preformed machine learning classifying model comprising the following steps:
providing a plurality of initial lists comprising words and/or strings with corresponding predefined attributes;
providing a plurality of initial sequence items such that each initial sequence item comprises one or more of the initial lists according to a predefined criterion;
generating the machine learning classifying model according to a machine learning process of the initial sequence items.

Preferably, the initial stage comprises feeding the initial sequence items as input to a machine learning mechanism unit that generates the machine learning classifying model according to a machine learning process of the initial sequence items.

Preferably, in case the model is the product of a supervised learning method, each sequence item has a tag attached to it. This tag can be produced either by an expert, or as a product of some other preprocessing performed on the sequence prior to it being used to produce the machine learning model.

The present invention relates to a method for generating a machine learning classifying model comprising:
providing a plurality of lists comprising words and/or strings with corresponding predefined attributes;
providing a plurality of sequence items such that each sequence item comprises one or more of the lists according to a predefined criterion;
generating the machine learning classifying model according to a machine learning process of the sequence items.

Preferably, the method comprises feeding the sequence items as input to a machine learning mechanism unit that generates the machine learning classifying model according to a machine learning process of the sequence items.

Preferably, the predefined criterion is a shared concept between all the lists in each sequence item.

Preferably, the plurality of sequence items comprise:
a. tagged sequence items tagged as related or nonrelated to an event;
b. non-tagged sequence items that are not tagged as related or nonrelated to an event.

Preferably, the event is a cyber-threat or related to a certain subject of interest.

Preferably, the tagged sequence items have been tagged manually.

Preferably, the sequence items are augmented by carrying out a comparison function between them and optionally other statistical pre-processing, such that each sequence item obtains additional information accordingly.

Preferably, the tagged sequence items with their tagging as related or nonrelated to an event are fed as input to a supervised machine learning mechanism unit that generates the machine learning classifying model according to a machine learning process of the sequence items comprising their tagging as related or nonrelated to an event.

Preferably, the supervised machine learning mechanism units are selected from the group consisting of support-vector machines (SVM) unit, random forests unit, regression, naïve Bayes, deep/recurrent neural networks unit.

Preferably, the untagged sequence items are fed as input to an unsupervised machine learning mechanism unit that generates the machine learning classifying model according to an unsupervised machine learning process of the sequence items.

Preferably, the sequence items are fed as input to more than one machine learning mechanism units that each one generates a machine learning classifying model according to its dedicated machine learning process of the sequence items.

Preferably, the method further comprises:
providing a plurality of validation lists comprising words and/or strings with corresponding predefined attributes;
providing a plurality of validation sequence items such that each validation sequence item comprises one or more of the validation lists according to a predefined criterion, and wherein said validation sequence items are each tagged as related or nonrelated to an event;
running the validation sequence items in the machine learning classifying models such that each machine learning classifying model outputs a determination for each validation sequence item if there is an occurrence of an online event or not;
comparing the results of the determination of each classifying model with its corresponding validation sequence items related or nonrelated to an event tag and assigning each classifying model with a score corresponding to the comparing results;
determining one or more classifying models to be used by either:
  i. carrying out an averaging and majority decision function on the assigned scores of the output classifying models and choosing one or more classifying models accordingly;
  ii. choosing the classifying models having assigned scores within a predefined range.

Preferably, the assigned score of each classifying model is the relation between the amount of times the classifying model output determinations were correct in relation to the related or nonrelated to an event tag of the validation sequence items.

The present invention relates to a system for detecting the occurrence of an online event comprising:
a database;
a processing unit coupled to said database and configured to detect an occurrence of an online event comprising:
  retrieving a data item from online sources;
  forming a list by tagging words and/or strings within the data item according to predefined attributes such that said list comprises the words and/or strings with their corresponding attributes;
  forming sequence items relating to the list according to a predefined criterion such that each sequence item comprises at least said list and optionally additional pre-formed lists stored in said database, that have been formed in the same manner as said list and that have a shared concept with said list according to the predefined criterion;
  running each of said sequence items in a preformed machine learning classifying model that outputs a determination if there is an occurrence of the online event or not.

Preferably, the system comprises crawler(s) (e.g. 100) and/or client APIs, a URL database (e.g. 105) a tagging module (e.g. 108) a database (e.g. 130), output classifying model(s) (e.g. component 120), an alerting module (e.g. 150), subscriber notifying module (e.g. 170) and mitigating module (e.g. 160).

The present invention relates to a system for generating a machine learning classifying model (said system is optionally part of the system for detecting the occurrence of an online event) comprising:
a database;
a processing unit coupled to said database and configured to generate a machine learning classifying model comprising:
providing a plurality of lists stored in said database comprising words and/or strings with corresponding predefined attributes;
providing a plurality of sequence items stored in said database such that each sequence item comprises one or more of the lists according to a predefined criterion;
generating the machine learning classifying model according to a machine learning process of the sequence items (wherein preferably the sequence items are fed as input to a machine learning mechanism unit that generates the machine learning classifying model according to a machine learning process of the sequence items).

Optionally, the system for detecting the occurrence of an online event may be in conjunction with the system for generating a machine learning classifying model.

BRIEF DESCRIPTION OF THE DRAWINGS

The present invention is illustrated by way of example in the accompanying drawings, in which similar references consistently indicate similar elements and in which:

FIG. 2A illustrates an example of a raw data item.

FIG. 2C illustrates an example of the various attribute types identified within the raw data item wherein each shape corresponds to a certain attribute type.

FIG. 2D illustrates the marking of the raw data item into a list to be stored in the system database.

FIG. 5a illustrates a histogram related to an example of the application of the present invention.

FIG. 5b illustrates a histogram related to an example of the application of the present invention.

DETAILED DESCRIPTION OF THE INVENTION

Figure 1:
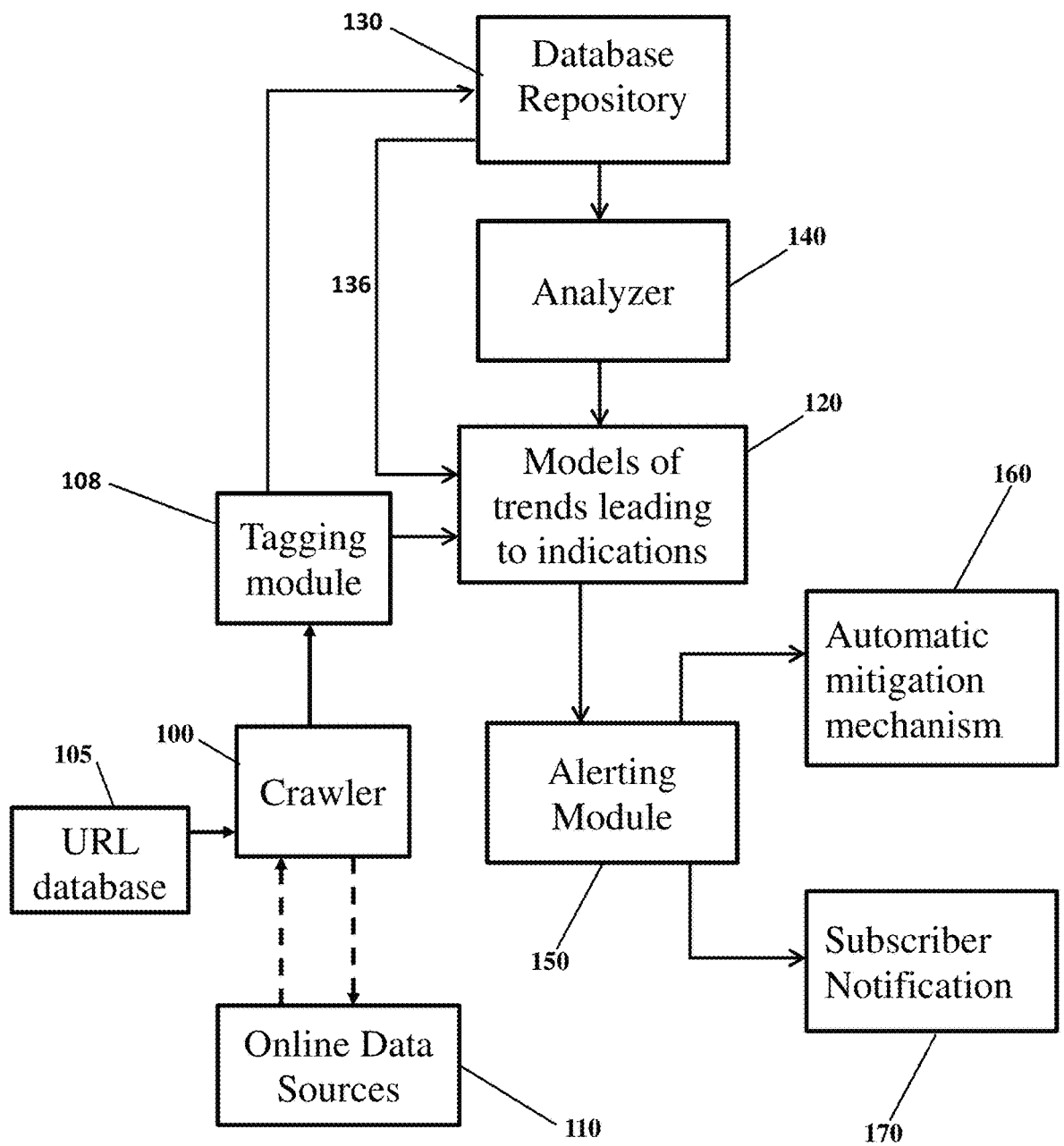
FIG. 1 illustrates a block diagram of features according to an embodiment of the present invention.

Several specific details are provided herein, such as examples of devices/components, and methods, to provide a thorough understanding of embodiments of the present invention. A person skilled in the art will understand, however, that the present invention can be implemented without one or more of the specific details or alternatively, well-known details are not described for the sake of clarity (and would be clearly understood by a person skilled in the art).

Some components disclosed herein may be implemented in hardware, software, or a combination thereof (e.g., firmware). Software components may be in the form of computer-readable program code stored in a computer-readable storage medium (e.g. a memory, mass storage device, removable storage device). For example, a computer-readable storage medium may comprise computer-readable program code for performing the function of a particular component. Likewise, computer memory may be configured to include one or more components/units, which may be executed by a processor. Software components/units may be implemented in logic circuits, for example. Components/units may be implemented separately in multiple modules or together in a single module.

The present invention relates to a method and system for providing a high level of security for protecting customers' assets from malicious activity aimed at disrupting, altering, or eliminating the availability and validity of these assets. Several corporate bodies, companies, businesses and various organizations possess a plurality of online assets. The present invention provides means for providing alerts prior to having an attack launched against any of these assets. These alerts can then be used to mitigate an imminent attack, possibly even automatically. The present invention further relates to a method and system for identifying items relating to a subject of interest of a subscriber and reporting so to the subscriber.

According to an embodiment of the present invention, the present invention relates to a system that comprises a collection of computers employed in one or more operations of a monitoring and alerting system. The computer may include a processor, or Advanced Micro Devices, for example. The computer may have one or more buses coupling its various components. The computer may include one or more user input devices (e.g., keyboard, mouse), one or more data storage devices (e.g., hard drive, optical disk, USB memory), a display monitor (e.g., LCD, flat panel monitor, CRT), a computer network interface (e.g., network adapter, modem), and a main memory (e.g., ROM, RAM). The computer network interface may be coupled to a computer network, which includes the Internet. It should be noted that the system may have less or more components to meet the needs of a particular application and may be implemented by a cluster of computers and computing resources, possibly in a distributed environment. The main memory may include software modules that may be loaded from the data storage device the main memory for execution by the processor.

The computers are adapted to execute computer program modules. As used herein, the terms "module", "component" or "unit" refer to computer program logic and/or data for providing the specified functionality. A module/component/unit can be implemented in hardware, firmware, and/or software. In one embodiment, the modules/components/units are stored on the storage device, loaded into the memory, and executed by the processor. Databases described herein may comprise a commercially available database or listing running in a computer. Similarly, the crawlers described herein may comprise computer-readable program code running in a computer.

The present invention system is typically a distributed system having modules, components, units and executable instruction sets located in different servers, and may be partially or completely based on access to servers via the internet, that is partially or completely "cloud based".

Trend-Based Real-Time Alerting and Mitigation

According to a first aspect of the present invention, the present invention relates to an online protection service for detecting a cyber-event and alerting service subscribers of imminent cyber-attacks taking place on their online assets.

According to a second aspect of the present invention, the present invention relates to a system and method for detecting an occurrence of an event (e.g. a certain trend) related to a subject of interest of a subscriber and rapidly informing the subscriber of so. Such events related to a subject of interest of a subscriber may include business-related trends. A trend may include Phishing, Fraud, Brand Abuse, Account for Sale, Carding, Attack tool, Leak Credential, Doxing, Inside Information, Malicious files (APK etc.), etc.

According to an embodiment of the present invention, the service operator utilizes a dedicated system for carrying out the assets protection or the informing of an occurrence of an action related to a subject of interest. The components of the system running the service may be implemented using one or more computers of the computer described hereinabove (e.g. forming a computer system).

The present invention relates to a system comprising a data acquisition module, which collects online data and stores it in a database repository. The data acquisition module comprises one or more crawlers 100 or client APIs (application programming interface) operated to persistently acquire online data-items by pursuing Uniform Resource Locators (URLs) of various sources of information available from online data sources 110. The URLs to be visited by the crawlers 100 are stored in a separate database 105. The URLs to be visited may be obtained from several main sources, e.g. (1) Experts, i.e., cyber analysts who are well versed in online cyber activity, (2) recursive mining for URLs appearing in previously acquired data, i.e., URLs that appear in any of data items previously obtained by the crawlers, and (3) customer/subscriber received online assets information, e.g., URLs of online assets related to/owned by/managed by a customer/subscriber, (4) subscriber received information relating to a subject of interest, e.g. URLs relating to the subject of interest. Optionally, the crawlers may visit URL pages that are found by a web search engine according to definitions relating to a subscriber subject of interest, e.g. the last 24 hours results of a web search engine after a certain term relating to the subject of interest (provided by the subscriber) is inputted therein.

The web crawlers 100 are employed to visit the websites of the provided URLs (provided by the separate database 105). The crawlers 100 are employed when visiting the links, to retrieve text objects related thereto (e.g. texts presented on the URL pages) along with their corresponding metadata providing information related to the method and source of acquiring the text objects (e.g., the URL from which the data item was retrieved, its timestamp, the type of source, etc.).

The information retrieved is initially analyzed and tagged according to the attributes of the different portions of the information from which it is comprised of (e.g. words, phrases, strings) in tagging module 108. Additional tagging data in connection to the retrieving (i.e. the metadata explained hereinabove) is also carried out.

The tagged information is stored in a database 130 such that each portion of information is stored with its corresponding tagged attributes and its corresponding metadata (e.g., the URL from which the data item was retrieved, its timestamp, the type of source, etc.).

The tagged information now received is analyzed with previously retrieved information previously stored in database 130. Then the tagged information is run in the one or more generated models (in component 120) in order to determine if there is a cyber-attack coming up or taking place or an occurrence of an action related to a subject of interest of the subscriber.

Accordingly, the subscriber is alerted or the cyber threat is automatically mitigated.

The tagging module 108 carries out an attributes identification. FIG. 2A shows an example of a raw data item obtained by the crawlers, along with metadata associated with the data item. In the example the source and the timestamp are shown.

The tagging module 108 comprises groups of attributes. Each group of attributes comprises a predefined list of keywords or string of keywords (not shown) that are associated with a specific attribute defining that group. The tagging module 108 scans the raw data item (e.g. text object) and identifies words (or strings) corresponding to the keywords or string of keywords in the predefined lists (and optionally identifies similar words from the words in the predefined lists having the same root, synonyms, etc.).

Figure 2B:
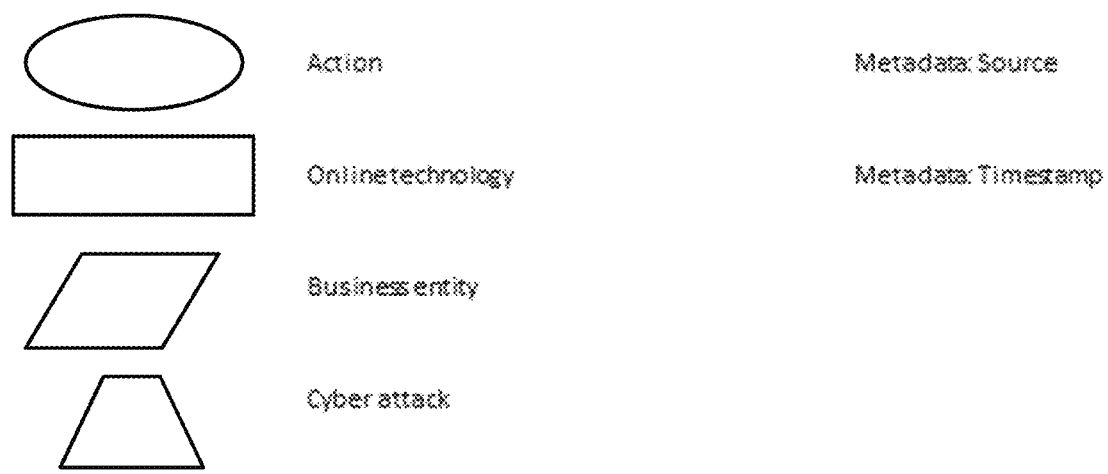
FIG. 2B illustrates a legend of attributes types corresponding to certain shapes.

The tagging module 108 tags/marks each of the identified words/strings according to the attribute group to which it belongs (according to the keyword association). FIG. 2B shows an example of groups of attributes in connection to the cyber-attack aspect of the present invention. Of course, other examples may have attributes relating to a subject of interest of a subscriber (e.g. according to the definitions of the subscriber). For illustrative purposes, near each attribute is a corresponding shape indicating that attribute. These attributes are either considered as textual attributes (i.e., corresponding to the actual text in the raw data item according to the keyword lists) or as metadata attributes, providing information related to the method and source of acquiring the data (e.g., the URL from which the data item was retrieved, its timestamp, the type of source, etc.). In this specific example (FIGS. 2B-2C) an "Action" attribute is indicated by an ellipse, an "Online technology" attribute is indicated by a rectangle, a "Business entity" attribute is indicated by a parallelogram, a "Cyber Attack" attribute is indicated by a trapezoid, a "Metadata Source type" attribute is indicated by a triangle and a "Metadata Time Stamp" attribute is indicated by a pentagon.

FIG. 2C shows the marking of the raw data item after the words/strings were marked, each appropriate shape surrounding the word/string representing the corresponding attribute according to FIG. 2B.

Once the raw data item is marked, the tagging module 108 gathers all the tagged/marked words/strings and stores them in a single list 125 as shown in FIG. 2D. The tagged attributes assigned to each word/string is also stored along with the word/string and present in the list. The representation of the raw obtained data is henceforth by using list 125 which is an abstraction and summary of the relevant cyber-related (or subject of interest related) data of the raw data item. Each list 125 is also actually a linked collections of data items. The list 125 is then stored in the database 130. Thus the database 130 throughout time will comprise a plurality of stored lists.

Figure 2E:
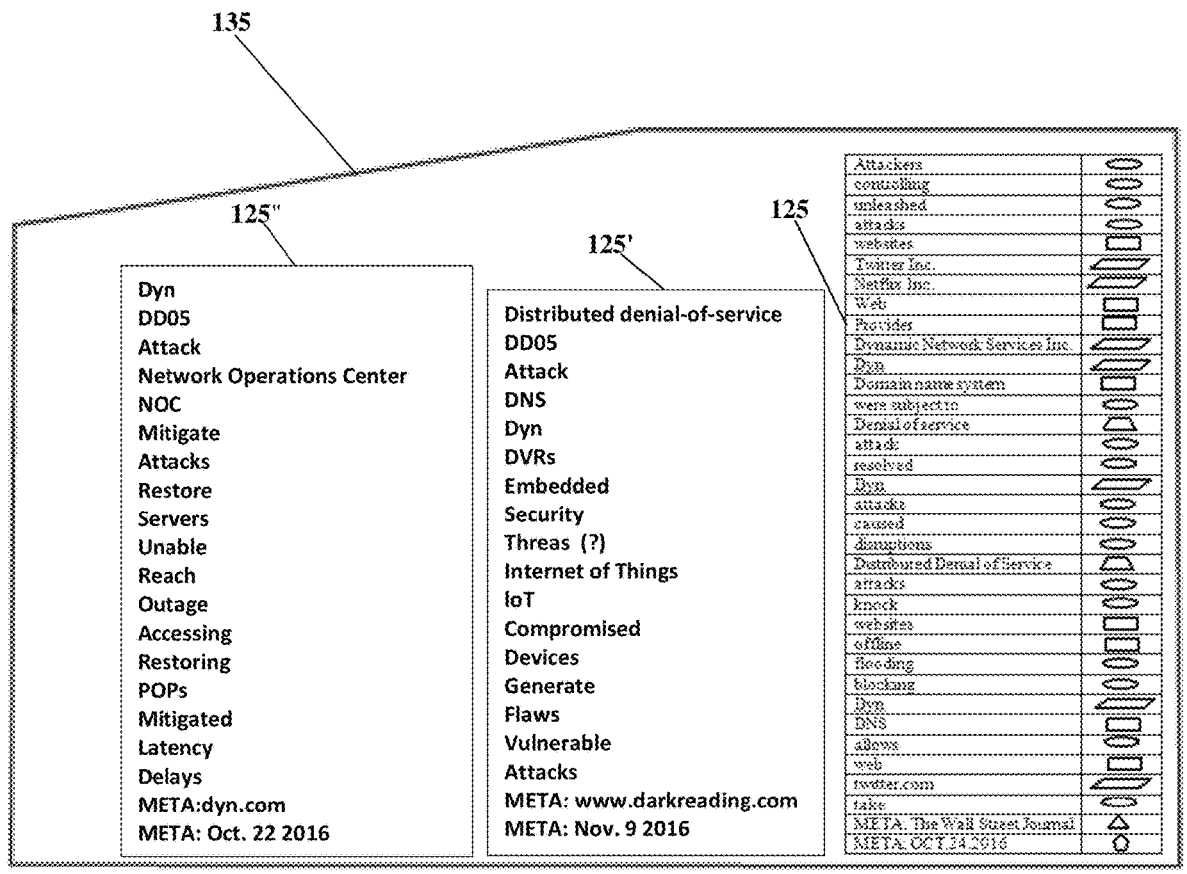
FIG. 2E illustrates a linked sequence (sequence item) of formatted data item lists corresponding to a shared concept, defined by the appearance of co-related concepts and attributes in all lists comprised within the linked sequence (sequence item).

The database comprises a processing layer that organizes the lists 125 stored therein into sequences according to a predefined criterion. The sequences formed are intra-related sequences (not necessarily disjoint) of data-items (tagged lists stored in the database), following, e.g., the Diamond taxonomy for intrusion detection. The predefined criterion may be defined by the system/service operator. Examples of forming these sequences according to a certain criterion may be grouping of lists into sequences (herein also referred to as "sequence items" or "linked sequences") according to a linked sequence of formatted data item lists 125 corresponding to a shared concept, defined by the appearance of co-related concepts and/or co-related attributes, e.g. a predefined number of common attributes of the lists in the sequence being formed, customer features appearing in the lists of the sequence being formed, time frame of the lists (e.g. according to the metadata of the lists in the sequence being formed), time intervals i.e. a sequence item being formed comprising all of the lists obtained from the internet within a certain time interval, attack tools, etc. More than one criterion may be applied for forming a certain sequence item. Typically a given list 125 may be associated (i.e. may be comprised within) more than one sequence items. FIG. 2E shows an example of three lists—list 125 (the list of FIG. 2D) and previously stored lists 125' and 125" forming a sequence item 135.

The batch analysis module 140 (also referred herein as analyzer 140 interchangeably) generates statistical classifying models by organizing the data stored in the database 130 and applying mathematical and statistical calculations thereon. The generated classifying models are used to indicate a cyber-threat or an occurrence of an action related to a subject of interest of a subscriber.

The data sequences stored (and organized) in the database 130 repository are accessed by the batch analysis module 140. The data-items sequences produced are thus used in the automatic definition of models which will be used to evaluate newly arriving lists.

Figure 3:
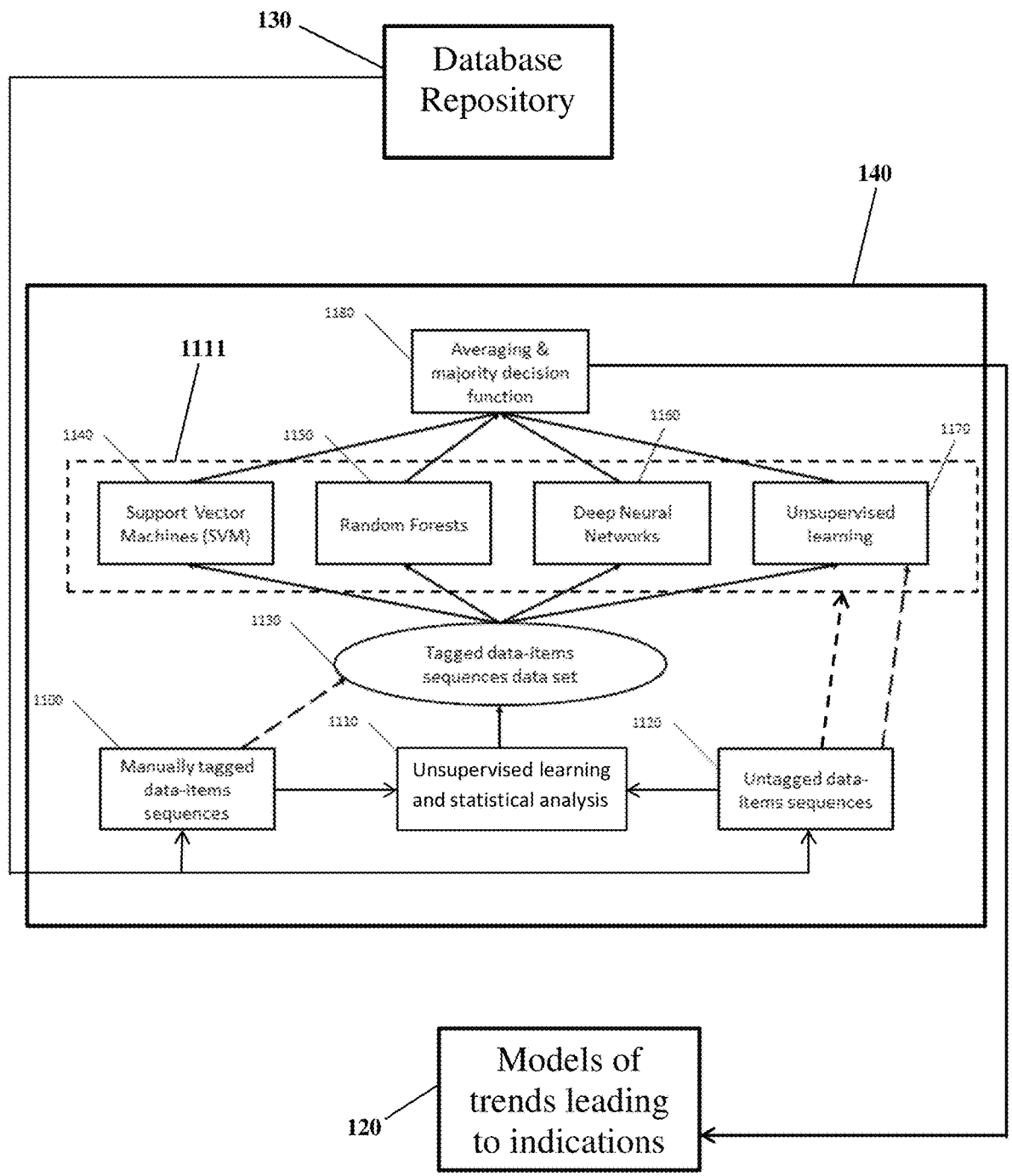
FIG. 3 illustrates a block diagram of the function of the analyzer according to an embodiment of the present invention.

FIG. 3 depicts the subsystem of the batch analysis module 140. According to one embodiment of the present invention, a plurality of stored sequence items 135 that have been stored in the database 130 are accessed by the batch analysis module 140.

Some of the stored sequence items in the database 130 are sequence items that have been separately manually tagged and stored as "related" or "non-related" (or "relevant"/"non-relevant") to a cyber-threat or to a subscriber subject of interest, in the database 130. In other words the sequence items (that their lists words comprised within them have already been pre-tagged by tagging module 108 and grouped into sequence items and stored in database 130 as explained hereinabove) have been reviewed manually and the whole sequence item has been tagged as relevant to a cyber-attack, or to another subscriber subject of interest (e.g. a company name). These sequence items (tagged as "related"/"non-related or "relevant"/"non-relevant") are also referred to herein as "manually tagged sequence items". Another group of the stored sequence items is a plurality of sequence items (that the lists words comprised within them have already been tagged by the tagging module 108 and grouped into sequence items and stored in database 130 as explained hereinabove) that have not been reviewed manually. The batch analysis module 140 accesses a plurality of manually tagged sequence items (or other data items) by component 1100 and accesses a plurality of non-reviewed sequence items (or other data items) by component 1120.

Both groups (from 1100 and from 1120) of sequence items are transferred to an unsupervised learning and statistical analysis component 1110. This component augments the information associated with each sequence item.

The augmenting of the sequence items may be by carrying out a comparison between all the sequence items in component 1110, thus obtaining additional information on each sequence item. Thus a product of the analysis may be scores relating to the weights of certain attributes within the entire plurality of sequence items, a score relating to the weight of the number of lists within each sequence item (optionally in relation to the number of lists within the other sequence items), a score relating to the number of elements (e.g. words, strings, etc.) within all of the lists in a given sequence item, a score relating to the number of attributes within the sequence item, etc. The required criterion for the augmenting may be defined by the system/service operator.

Usually the number of untagged sequence items is substantially greater than the number of tagged sequence items. However, these additional comparison features provide additional comparison input vector scores for the machine learning, thus making it more effective. This augmentation may be viewed as adding additional attribute fields and corresponding scores to the sequence item, in addition to the attributes within each list which will be considered in the machine learning process. Preferably, both the tagged sequence items and the non-tagged sequence items are augmented by the augmenting feature, as the augmentation feature comparison is preferably carried out between all sequence items.

Augmenting the sequence items and effectively providing additional information to the sequence items may include the following:

Statistics of information related to current sequence items-serves to identify anomaly detection of a data item (e.g. word, string, etc.) appearing within a sequence item in relation to its appearance within other sequence items and receiving a score accordingly. For example, the anomaly detection may relate to items such as customer, cyber actors, attack methods, etc. Optionally the sequence item may receive a score according to the statistics of information in a manner by comparing the amount of times that the data item (e.g. word, string, etc.) appeared within a certain time interval (that its sequence item lists timestamps are therewithin) in comparison to the amount of times that the data item (e.g. word, string, etc.) appeared out of the time interval. The time interval may relate to short term intervals or long term intervals (seconds, minutes, hours, days, months, years, etc.). Typically, the longer term intervals provide a general context for the sequence items being evaluated.

According to an embodiment of the present invention, virtual-tagging of some untagged sequence items may be carried out according to their similarity to other tagged sequence items using, e.g., clustering. For example, each non-reviewed sequence item is compared with the manually reviewed sequence item. If similarity is detected (e.g. by clustering) between the non-reviewed sequence item and the manually reviewed sequence item it was compared with (to be above a certain threshold)—the "non-reviewed sequence item" is henceforth tagged with the same tagged sequence item tag (e.g. relevant or not to a cyber-attack, or to a subscriber subject of interest) as that of the manually reviewed sequence item that it was compared with.

The tagged sequence items (i.e. the manually tagged sequence items from component 1100, or the "virtually tagged sequence items" (i.e. the non-reviewed sequence items that have been found similar to at least one manually tagged sequence item and tagged accordingly as carried out in component 1110, as described hereinabove) that have been augmented then form the tagged sequence items data set 1130 which is used by the machine learning mechanism units 1111 for producing the models for alerting.

Optionally, according to one embodiment, component 1110 may be used for forming additional lists being a "list of lists" i.e. comprising the identities of the plurality of the sequence items from the database having common attributes or other common technical or statistical features and adding them to the augmented sequence items (thus also being part of the data set 1130 which is used by the machine learning mechanism units 1111 for producing the classifying models for alerting).

According to a preferred embodiment of the present invention, one or more machine learning mechanism units 1111 (of supervised learning algorithms) access the augmented tagged sequence items in data set 1130. Examples of the machine learning mechanism units 1111 based on supervised learning algorithms, are support-vector machines (SVM) unit 1140, random forests unit 1150, deep neural networks unit 1160 and various indexing methods of data. Optionally these methods can be augmented by additional widely used methodologies. An example of some commonly used modules and algorithms may be found in "Understanding Machine Learning: From Theory to Algorithms", by Shai Shalev-Shwartz and Shai Ben-David, Cambridge University Press (2014).

The mechanism units 1111 receive the data set of sequence items 1130 and run them therein each by performing its dedicated algorithms and thus each producing one or more output models.

The machine learning mechanism units 1111 carry out a training phase in which each of the augmented tagged sequence items (comprising the lists with words/strings with their assigned attributes, augmented features such as additional fields and corresponding scores, and sequence item "manual" or "virtual" relevancy determination) are inputted into the machine learning unit, and output classifying models (for each mechanism unit) are thus generated (by the machine learning calculations).

A validation phase is then carried out to the output classifying models. The efficiency of the output classifying models is evaluated by obtaining a plurality of validation sequence items. The validation sequence items are tagged sequence items (typically manually or possibly virtually similar to as explained hereinabove) equivalent to the tagged sequence items 135 stored in database 130. The validation sequence items may be stored in another database or stored in database 130 (at another location such that they are not taken for or considered in the training phase). The validation sequence items are obtained by the analyzer 140 which runs the validation sequence items in the output classifying models thus producing a relevancy or non-relevancy indication for each validation sequence item. The results of the determination of the classifying models for each validation sequence item is compared with its actual tagged result (i.e. relevant or irrelevant), and thus each output classifying model is assigned with a corresponding score (relating to the validation sequence determination results of the classifying model). A typical example of a corresponding score is the percentage of the amount of times the classifying model was correct (in comparison to the actual tagged result (relevant or irrelevant) of the validation sequence items).

An averaging and majority decision function component 1180 applies an averaging and majority votes function on the produced assigned scores of the output classifying models. The averaging function typically chooses the models with the highest score/s, or scores that are within a predefined range (or scores that are above a predefined threshold), for further analysis. This averaging may comprise several types of averaging functions, thus outputting an average (one or more) output classifying model(s) to component 120 which is/are then used for evaluating the cyber relevance and severity of newly arriving data-items (e.g. sequences), as they are collected by the crawlers.

According to another embodiment of the analyzer 140 function of the present invention, only the manually tagged sequence items from component 1100 are used in the analyzer 140 for creating the output classifying model(s) transferred to component 120 (see dotted arrow from 1100 to 1130).

According to another embodiment of the analyzer 140 function of the present invention, the non-reviewed untagged sequence items of component 1120 (see doted arrow from 1120 to 1111) are used in the analyzer 140 for creating output classifying model(s) (from the mechanism units 1111 to component 1180) to be optionally used in component 120. According to one particular embodiment an unsupervised learning mechanism unit 1170 (of the mechanism units 1111) accesses the non-reviewed untagged sequence items from component 1120 (see doted arrow from 1120 to 1170) and produces an output classifying model by using a dedicated function for untagged sequence items. The unsupervised learning mechanism unit 1170 may carry out predefined calculations relating to identifying cyber-attacks or subscriber subjects of interest. Examples of such unsupervised learning include calculations featuring clustering (e.g., k-means, hierarchical), density estimation, correlation analysis, and various other statistical analysis tools.

The output classifying model(s) of the averaging and majority decision function component 1180 are received in component 120 (models of trends leading to indications (cyber threats or subscriber subjects of interest)). The data list 125 from the tagging module 108 currently obtained in real-time by the crawlers 100, is stored in the database 130 and forms one or more sequence items as explained hereinabove. Component 120 then accesses (136) all the sequence items relating to the currently obtained data list 125 and runs them in the classifying model(s) therein producing an output result score for each sequence item. The classifying model(s) in component 120 serve as a trend-identifier module and acts upon the accessed sequence items relating to the newly arrived lists 125 in real-time. Component 120 thus produces a final conclusion output result being "related" or "non-related" (or "relevant"/"non-relevant") to a cyber-threat or to a subscriber subject of interest. If the result is deemed related or relevant to a cyber-threat or to a subscriber subject of interest the system initiates an alert being (or indicating) a "positive cyber threat"/"positive relation to a subscriber subject of interest". If the result is deemed non-related or non-relevant to a cyber-threat or to a subscriber subject of interest the system does not initiate an alert, being a "negative cyber threat"/"negative relation to a subscriber subject of interest". According to a preferred embodiment, even if only one sequence item relating to a newly arrived list is found "relevant"—then an alert is triggered.

According to an embodiment of the present invention, the analyzer 140 may output more than one classifying model. According to this embodiment when a new sequence item relating to a new data list obtained, it is run in all of the outputted classifying models in component 120. An averaging/weighing function uses all the results of the new sequence item run in all the output classifying models (thus obtaining a plurality of results, one for each output classifying model in component 120), to decide whether to trigger an alert or not. An example of such a function is as follows. Assuming the decision function 1180 in the analyzer 140 decides to output two classifying models based on the supervised learning mechanism units, e.g. SVM mechanism unit 1140 and random forests mechanism unit 1150, alongside a classifying model based on a single unsupervised mechanism unit 1170, e.g. k-means clustering. When the new sequence item is run in each of these output classifying models they produce output scores, e.g. a number between 0 and 100, where 0 means "no cyber threat" (or "no relation to a subscriber subject of interest") and 100 means "definite positive cyber threat" (or "definite positive relation to a subscriber subject of interest"). The decision function may determine whether to generate an alert based on an averaging function such as:
a. if the score of at least one of the output scores is within a certain range (e.g. above a certain threshold).
b. if the average of at least two (or three or more) of the output scores is within a certain range (e.g. above a certain threshold).

Predefined weights may be added to specific output scores during the decision function calculations to determine whether or not a result is within the predefined range. Additional averaging techniques may be included (e.g. averaging techniques applied which are known in the art) for the determination.

The decision function may be defined, for example, as follows:
 If the weighted average of scores produced by the three classifying models (with some predefined weights) is greater than 70, output an alert.
 Otherwise, if a majority of two (out of the three classifying models) provide a score above 80, output an alert.
 In all other cases do not output an alert.

It is noted that the above merely serves as an example of an embodiment of such a decision function, and the proposed solution may apply additional/different such decision functions.

Thus, in summary, the component 120 accesses the output classifying model(s) from the analyzer 140, and the sequence items relating to a newly arrived list. Component 120 runs each sequence item in the output classifying model(s) producing corresponding relevance scores. The relevance scores are analyzed according to a decision function which produces a final relevance score output which indicates on the occurrence of the event (whether to trigger an alert or not). This is carried out for all the sequence items relating to the newly arrived list. According to a preferred embodiment even if only one of the sequence items running in the classifying models and only one classifying module determines relevancy—the final relevance score is positive and an alert is triggered.

Based on the configuration of related sequences, and the effect newly arriving data-items have on these sequences, the trend-module identifier component 120 initiates the alert.

The output of component 120 (either triggering an alert or not) is received in the alerting module 150. If an alert is not triggered then no action takes place. The alerting module 150 is connected to a subscriber notifying module 170 configured to notify (e.g. warn) the subscriber of the cyber-attack (or positive relation to a subscriber subject of interest) detected. The notification may be implemented by various types of user interfaces such as a dashboard. This dashboard can be implemented in various ways, and present alerts in a variety of manners, such as real-time plotting of threats based on data statistics, detailed reports, links to related data-items attesting to the threat, etc.

The alert may be sent to the subscriber via an internet network (e.g. by email or other dedicated application). Optionally in case of the cyber threat aspect, the subscriber may receive a recommendation on possible remedies to mitigate the attack. The subscriber can take action to mitigate the threat according to information on its mitigation.

According to an embodiment of the present invention (useful for cases with the cyber threat aspect), the alerting module 150 is connected to a mitigating module 160 configured to cure the cyber-attack. The mitigating module 160 performs an actionable step by curing the threat, e.g. by a system reboot or re-initialization, credentials update, request for action from a third party or a subscriber's sector, closing vulnerable ports, upgrading a software module, etc. Alternatively, the subscriber can notify a service operator to review and mitigate the threat (e.g., having a system administrator start a "costly" backup/migration process, taking down a website for some time until the problem is solved, etc.).

The subscriber may choose which of the manners of system function he prefers, i.e. to automatically mitigate according to mitigating module 160 or to be alerted and asked according to subscriber notifying module 170. In any case, even if the automatic mitigation according to mitigating module 160 is chosen, the dashboard can be sent to the subscriber showing the threat that occurred and its mitigation. Alerting module 150 may be set to choose between alerting the subscriber via subscriber notifying module 170, initiate an actionable step via mitigating module 160 or both. Mitigating module 160 may be replaced with options for taking actionable steps relating to the outcome of the subscriber subject of interest, when a positive detection is made regarding the subscriber subject of interest, mutatis mutandis.

For simplicity, the system for detecting the occurrence of an online event was explained in conjunction with the system for generating a machine learning classifying model, shown in FIG. 1.

The URL database 105 is coupled to the crawler 100 which is coupled to the processor (or part of it). The processor is configured to run the tagging module 108, the component comprising models for identifying trends leading to cyber threats 120, the analyzer 140, the alerting module 150, the mitigating module 160 and the subscriber warning module 170. The processor is coupled to the database 130. The database 130 is coupled to the component comprising models for identifying trends leading to cyber threats 120.

Example 1

Figure 4:
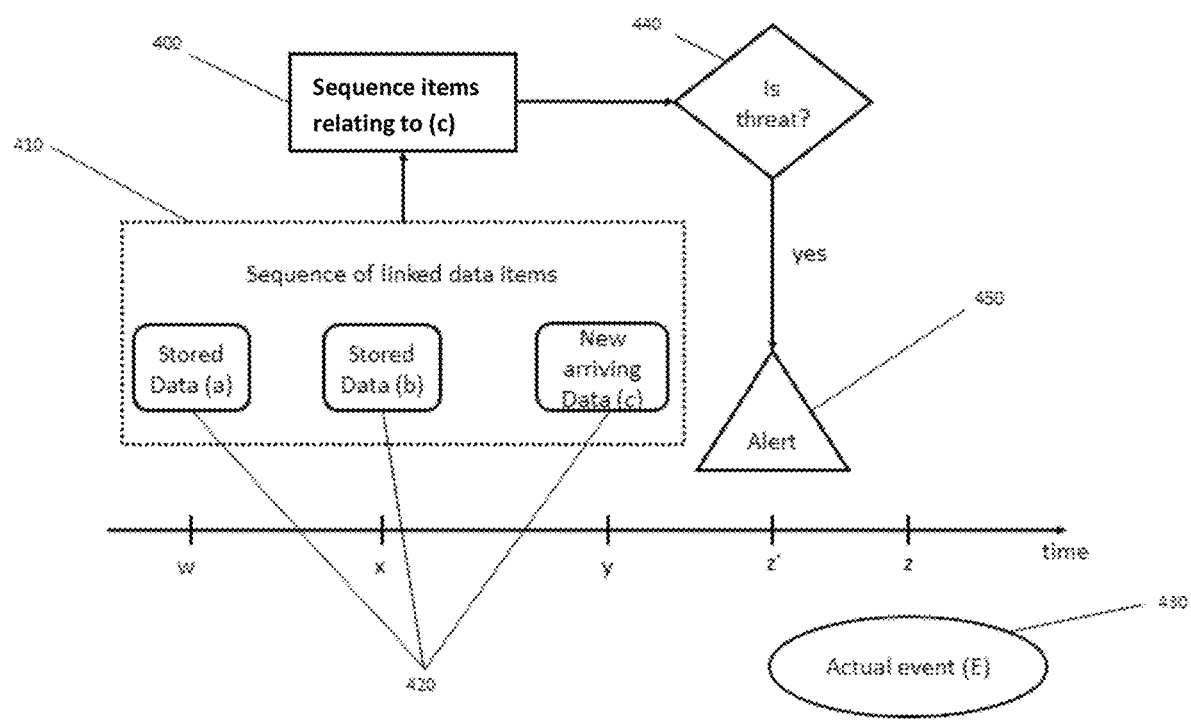
FIG. 4 illustrates a block diagram of an example of linked events triggering an alert of the present invention.

FIG. 4 presents an example of the use of the present invention according to the cyber threat aspect. The figure shows a timeline of linked sequences 410 of three data items 420, indicating an alert event 430 with an alert pre-triggered. For simplicity of understanding the concept of operation, the linked sequences comprise 3 data-items, but this general concept can be readily adapted to longer (or shorter) linked sequences, and typically with many more data-items e.g., tens, hundreds, thousands, etc. FIG. 4 indicates a stored date-item (a) that has arrived at time w and a stored data-item (b) that has arrived at time x. These data items have been stored in the database repository (130). At time y a new data-item (c) has arrived, thus completing a linked sequence 410 of data items 420. These data items are grouped by their characteristics and types into a single linked sequence.

The classifying model 440 (within component 120 in FIG. 1), which has been generated by the analyzer module receives the information on new data-item (c) (all the sequence items relating to (c) including sequence item 410) and determines whether a cyber-attack is commencing or has commenced or will commence. The sequence item 410 is run in the classifying model 440 within component 120. If a threat is indeed discerned then an alert 450 is triggered at time z', which is preferably prior to the actual predicted imminent attack event (E) 430 which occurs at time z>z'. The prediction may be an estimate or based on probability distribution.

The notification of event (E) could be sent to specific sources, e.g., the subscriber. Thus the present invention actually serves as a precursor indicator for the imminence of cyber-attack event (E).

Example 2

In the following example (Shown in FIGS. 5a-5b) it is shown how the present invention system can be used to identify an imminent DDoS attack (according to the cyber threat aspect). The database comprises ~500K data items related to the subscriber, as gathered by crawlers from various online sources.

On day X, the system identified a data-item D retrieved from one of the sources which included the Python code for performing a DDoS attack. The data-item also included information relating it to the subscriber. Several similar data-items were then identified (when forming a sequence item according to a predefined criterion) in the range of 3 days prior to X, which shared some of the characteristics data-item D acquired on day X. Not all these data-items clearly identified the subscriber, but they had other characteristics allowing to relate them to data-item D. Data-item D was linked to the other data items, thus forming a common sequence item.

The histogram of related data-items identified by day in the relevant period is provided in FIG. 5a (wherein 5 indicates a high severity score, 0 indicates low severity score). This histogram and the data-items involved, serve as a linked sequence of data-items corresponding to the module sequence 410 described in FIG. 4.

Two days after X, the system identified (and triggered an alert of) highly anomalous activity in a common social media source related to the subscriber which explicitly mentioned the inability to reach some of the subscriber's online resources.

The histogram of data-items corresponding to social-media related to the subscriber, and the occurrence of inaccessibility is provided in FIG. 5*b*. The number of events detected (close to 25) is on the Y-axis in FIG. 5*b*. This histogram contributes to a linked sequence attesting to the occurrence of an event (E) in FIG. 4.

Such use-cases are used by the Analyzer module to produce models which identify patterns of data-item evidence preceding a cyber-attack. Furthermore, the present invention is able to identify the preliminary cues in real-time and alert the beneficiary prior to an attack taking place.

The present invention relates to a method for detecting an occurrence of an online event (e.g. a method for operating and running the system described herein according to all of its embodiments and variations).

Preferably, the method comprises: retrieving a data item from online sources (e.g. via the web crawlers 100, client APIs, as described herein; optionally by use of a URL database 105, as described herein; online data sources may be the internet, or other data repositories accessed via Internet/network);
forming a list by tagging (e.g. by tagging module 108 as described herein) words and/or strings within the data item according to predefined attributes such that said list comprises the words and/or strings with their corresponding attributes;
forming sequence items (e.g. in database 130 and then accessed (136) by component 120) relating to the list according to a predefined criterion such that each sequence item comprises at least said list and optionally additional preformed lists that have been formed in the same manner as said list and that have a shared concept with said list according to the predefined criterion;
running each of said sequence items in a preformed (i.e. pre-established, pre-built, pre-generated) machine learning classifying model (e.g. component 120) that outputs a determination if there is an occurrence of the online event or not.

Preferably, the data item is a webpage content (e.g. internet webpage content).

Preferably, the online event relates to a cyber-threat or to a certain subject of interest.

Preferably, the method further comprises alerting a certain person (e.g. alerting module 150) when the determination of the occurrence of the event is deemed positive (e.g. via subscriber notifying module 170).

Preferably, the method further comprises performing an actionable step when the determination of the occurrence of the event is deemed positive, e.g. mitigating a cyber-threat (e.g. via mitigating module 160).

Preferably, the list comprises a metadata attribute relating to the time or source of the retrieval of the data item.

Preferably, the method comprises running each sequence item in one or more preformed machine learning classifying models that output a determination if there is an occurrence of the online event or not (e.g. cyber-threat or concerning a subscriber subject of interest), and applying an averaging function on the outputs of the machine learning classifying models that outputs a final determination if there is an occurrence of the online event or not.

Preferably, the method further comprises an initial stage of generating the preformed machine learning classifying model comprising the following steps:
providing a plurality of initial lists comprising words and/or strings with corresponding predefined attributes;
providing a plurality of initial sequence items such that each initial sequence item comprises one or more of the initial lists according to a predefined criterion;
generating the machine learning classifying model according to a machine learning process of the initial sequence items.

Preferably, the initial stage comprises feeding the initial sequence items as input to a machine learning mechanism unit (e.g. analyzer 140) that generates the machine learning classifying model according to a machine learning process of the initial sequence items. The initial stage may comprise any of the steps in relation to the method for generating a machine learning classifying model described herein (e.g. the method as described hereinbelow).

The present invention relates to a method for generating a machine learning classifying model comprising:
providing a plurality of lists comprising words and/or strings with corresponding predefined attributes;
providing a plurality of sequence items such that each sequence item comprises one or more of the lists according to a predefined criterion;
generating the machine learning classifying model according to a machine learning process of the sequence items.

Preferably the method comprises feeding the sequence items as input (e.g. from database 130) to a machine learning mechanism unit (e.g. analyzer 140) that generates the machine learning classifying model according to a machine learning process of the sequence items.

Preferably, the predefined criterion is a shared concept between all the lists in each sequence item.

Preferably, the plurality of sequence items comprise:
a. tagged sequence items tagged as related or nonrelated to an event;
b. non-tagged sequence items that are not tagged as related or nonrelated to an event.

Preferably, the event is a cyber-threat or related to a certain subject of interest.

Preferably, the tagged sequence items have been tagged manually. Preferably, the sequence items are augmented by carrying out a comparison function between them and optionally other statistical pre-processing (i.e. and/or additional statistical data produced by preprocessing), such that each sequence item obtains additional information accordingly.

Preferably, the tagged sequence items with their tagging as related or nonrelated to an event are fed as input to a supervised machine learning mechanism unit (e.g. 1111) that generates the machine learning classifying model according to a machine learning process of the sequence items comprising their tagging as related or nonrelated to an event.

Preferably, the supervised machine learning mechanism units are selected from the group consisting of support-vector machines (SVM) unit, random forests unit, regression, naïve Bayes, deep/recurrent neural networks unit.

Preferably, the untagged sequence items are fed as input to an unsupervised machine learning mechanism unit (e.g. 1170) that generates the machine learning classifying model according to an unsupervised machine learning process of the sequence items.

Preferably, the sequence items are fed as input to more than one machine learning mechanism units that each one generates a machine learning classifying model according to its dedicated machine learning process of the sequence items.

Preferably, the method further comprises:
providing a plurality of validation lists comprising words and/or strings with corresponding predefined attributes;
providing a plurality of validation sequence items such that each validation sequence item comprises one or more of the validation lists according to a predefined criterion, and wherein said validation sequence items are each tagged as related or nonrelated to an event;

running the validation sequence items in the machine learning classifying models such that each machine learning classifying model outputs a determination for each validation sequence item if there is an occurrence of an online event or not;

comparing the results of the determination of each classifying model with its corresponding validation sequence items real actual tagged results (i.e. related or nonrelated to an event tag) and assigning each classifying model with a score corresponding to the comparing results;

determining one or more classifying models to be used by either:
  i. carrying out an averaging and majority decision function on the assigned scores of the output classifying models and choosing one or more classifying models accordingly;
  ii. choosing the classifying models having assigned scores within a predefined range.

Preferably, the assigned score of each classifying model is the relation between the amount of times the classifying model output determinations were correct in relation to the related or nonrelated to an event tag of the validation sequence items.

While some of the embodiments of the invention have been described by way of illustration, it will be apparent that the invention can be carried into practice with many modifications, variations and adaptations, and with the use of numerous equivalents or alternative solutions that are within the scope of a person skilled in the art, without departing from the spirit of the invention, or the scope of the claims.

The invention claimed is:

1. A method for generating a machine learning classifying model comprising:
    providing a plurality of lists comprising words and/or strings with corresponding predefined attributes;
    providing a plurality of sequence items such that each sequence item comprises one or more of the lists according to a predefined criterion, wherein the plurality of sequence items comprise: tagged sequence items tagged as related or nonrelated to an event, and non-tagged sequence items that are not tagged as related or nonrelated to an event;
    generating the machine learning classifying model according to a machine learning process of the sequence items by feeding the non-tagged sequence items as inputs to an unsupervised machine learning mechanism unit that generated the machine learning classifying model according to an unsupervised machine learning process of the sequence items; and
    pairing the machine learning classifying model with a mitigating module configured to be triggered based on a plurality of outputs of the machine learning classifying model, wherein a first output of the machine learning classifying model is configured to trigger a first mitigation action from the mitigating module and a second output of the machine learning classifying model is configured to trigger a second mitigation action from the mitigating module.

2. The method according to claim 1, wherein the method comprises feeding the sequence items as input to a machine learning mechanism unit that generates the machine learning classifying model according to a machine learning process of the sequence items.

3. The method according to claim 1, wherein the predefined criterion is a shared concept between all the lists in each sequence item.

4. The method according to claim 1, wherein the event is a cyber-threat or is related to a certain subject of interest.

5. The method according to claim 1, wherein the tagged sequence items have been tagged manually.

6. The method according to claim 1, wherein the sequence items are augmented by carrying out a comparison function between them and optionally other statistical pre-processing, such that each sequence item obtains additional information accordingly.

7. The method according to claim 1, wherein the tagged sequence items with their tagging as related or nonrelated to an event are fed as input to a supervised machine learning mechanism unit that generates the machine learning classifying model according to a machine learning process of the sequence items comprising their tagging as related or nonrelated to an event.

8. The method according to claim 7, wherein the supervised machine learning mechanism units are selected from the group consisting of support-vector machines (SVM) unit, random forests unit, regression, naïve Bayes, and deep/recurrent neural networks unit.

9. The method according to claim 2, wherein the sequence items are fed as input to more than one machine learning mechanism units that each generate a machine learning classifying model according to its dedicated machine learning process of the sequence items.

10. The method according to claim 9, further comprising:
    providing a plurality of validation lists comprising words and/or strings with corresponding predefined attributes;
    providing a plurality of validation sequence items such that each validation sequence item comprises one or more of the validation lists according to a predefined criterion, and wherein said validation sequence items are each tagged as related or nonrelated to an event;
    running the validation sequence items in the machine learning classifying models such that each machine learning classifying model outputs a determination for each validation sequence item if there is an occurrence of an online event or not;
    comparing the results of the determination of each classifying model with its corresponding validation sequence items related or nonrelated to an event tag and assigning each classifying model with a score corresponding to the comparing results; and
    determining one or more classifying models to be used by either:
    carrying out an averaging and majority decision function on the assigned scores of the output classifying models and choosing one or more classifying models accordingly; and
    choosing the classifying models having assigned scores within a predefined range.

11. The method according to claim 10, wherein the assigned score of each classifying model is the relation between the amount of times the classifying model output determinations were correct in relation to the related or nonrelated to an event tag of the validation sequence items.

* * * * *